United States Patent
Galliano et al.

(10) Patent No.: US 10,021,176 B2
(45) Date of Patent: Jul. 10, 2018

(54) METHOD AND SERVER FOR MANAGING TRAFFIC-OVERLOAD ON A SERVER

(71) Applicant: EFFICIENT IP SAS, La Garenne Colombes (FR)

(72) Inventors: Sylvain Galliano, La Garenne Colombes (FR); Jean-Yves Bisiaux, La Garenne Colombes (FR)

(73) Assignee: EFFICIENT IP SAS, La Garenne Colombes (FR)

(*) Notice: Subject to any disclaimer, the term of this patent is extended or adjusted under 35 U.S.C. 154(b) by 218 days.

(21) Appl. No.: 14/962,528

(22) Filed: Dec. 8, 2015

(65) Prior Publication Data
US 2016/0197989 A1    Jul. 7, 2016

(30) Foreign Application Priority Data
Jan. 7, 2015    (EP) .................................. 15305012

(51) Int. Cl.
*G06F 15/173* (2006.01)
*H04L 29/08* (2006.01)
(Continued)

(52) U.S. Cl.
CPC ........ *H04L 67/1036* (2013.01); *H04L 43/062* (2013.01); *H04L 61/1511* (2013.01);
(Continued)

(58) Field of Classification Search
CPC . H04L 43/062; H04L 61/1511; H04L 67/2842
(Continued)

(56) References Cited

U.S. PATENT DOCUMENTS 8,732,268 B2 * 5/2014 Huang ................ H04L 61/1511
                                                    709/224
8,943,170 B2 * 1/2015 Li ........................ H04L 67/322
                                                    709/217

(Continued)

FOREIGN PATENT DOCUMENTS

CN        102291411 A      12/2011

OTHER PUBLICATIONS

Anonymous: "README.txt—namebench—Open-source DNS Benchmark Utility—Google Project Hosting", Jan. 6, 2012 (Jan. 6, 2012), pp. 1-4, XP055177836 retrieved from the Internet: URL:https://web.archive.org/web/20120106145825/http:/1 code.google.com/p/namebench/source/browse/trunk/README.txt [retrieved on Mar. 19, 2015].

(Continued)

*Primary Examiner* — Bharat N Barot
(74) *Attorney, Agent, or Firm* — BCF LLP

(57) ABSTRACT

Method(s) and System(s) for managing traffic-overload on Domain Name System (DNS) server during a network overload are described. The described system(s) may implement method(s) that include monitoring of traffic associated with the DNS server and identifying an occurrence of an event. Thereafter, activating (deactivating) a rescue mode and implementing one or more policies for handling the traffic during the rescue mode. In implementing the one or more policies, the method includes segregating the traffic into three sets of requests based on availability of responses in a cache, and a Time to Live (TTL) associated with the responses. Further, the method includes processing a first set of requests for which corresponding responses stored in the cache have expired based on TTL of corresponding responses. Furthermore, the method includes transmission of the corresponding responses with expired data to the client devices.

14 Claims, 5 Drawing Sheets

(51) Int. Cl.
*H04L 12/26* (2006.01)
*H04L 29/12* (2006.01)
*H04L 29/06* (2006.01)

(52) U.S. Cl.
CPC ........ *H04L 63/1458* (2013.01); *H04L 67/101* (2013.01); *H04L 67/1008* (2013.01); *H04L 67/2842* (2013.01); *H04L 67/2861* (2013.01); *H04L 67/32* (2013.01)

(58) Field of Classification Search
USPC .................................. 709/202–203, 223–224
See application file for complete search history.

(56) References Cited

U.S. PATENT DOCUMENTS

| | | | | |
|---|---|---|---|---|
| 9,325,662 | B2* | 4/2016 | Luna | H04L 61/1511 |
| 9,444,916 | B2* | 9/2016 | Backholm | H04L 61/1511 |
| 2010/0223364 | A1* | 9/2010 | Wei | H04L 61/1511 |
| | | | | 709/220 |
| 2010/0228819 | A1* | 9/2010 | Wei | H04L 67/1095 |
| | | | | 709/203 |
| 2012/0179801 | A1* | 7/2012 | Luna | H04L 61/1511 |
| | | | | 709/223 |
| 2013/0198269 | A1* | 8/2013 | Fleischman | H04L 61/1511 |
| | | | | 709/203 |
| 2014/0082172 | A1* | 3/2014 | Chueh | H04L 61/1511 |
| | | | | 709/223 |
| 2014/0304386 | A1* | 10/2014 | Lyon | H04L 61/1511 |
| | | | | 709/223 |

OTHER PUBLICATIONS

European Search Report with regard to the European Patent Application No. 15305012 dated Jun. 11, 2015.

English Abstract of CN102291411 retrieved from Espacenet on Nov. 6, 2015.

* cited by examiner

METHOD AND SERVER FOR MANAGING TRAFFIC-OVERLOAD ON A SERVER

TECHNICAL FIELD

The present subject matter relates, in general, to managing traffic overload and, in particular, to managing traffic overload on a Domain Name System (DNS) server.

BACKGROUND

Domain Name System (DNS) server, in general, refers to a service or a server that translates a domain name, such as, a website name or a Uniform Resource Locator (URL) into an Internet Protocol (IP) address. The IP address may be an identifier of a node (computing device), in particular, a host, within a network of nodes and may be utilized for communication between the host and other nodes within the network. The host, as identified by the IP address, may store content associated with the website name or the URL and may provide the content to the DNS server and/or a client device of a user that requested the domain name. For translating the domain name into the IP address, the DNS server may utilize mapping information that generally includes records of most frequently requested domain names with their respective IP addresses.

On some instances, the DNS server may not be able to translate the domain name to the corresponding IP address, due to reasons, such as unavailability of the mapping information for the domain name. The DNS server, on such occasions, may request another DNS server, often referred to as a backend server or an authoritative server, to provide the corresponding IP address. The backend server, upon receiving the request, may search for the corresponding IP address within mapping information stored in the cache (or database) of the backend server and provide the corresponding IP address to the DNS server. A host may then be identified based on the IP address for retrieving content associated with the domain name and providing the content to the client device.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example only, and with reference to the accompanying figure(s), in which.

Figure 1:
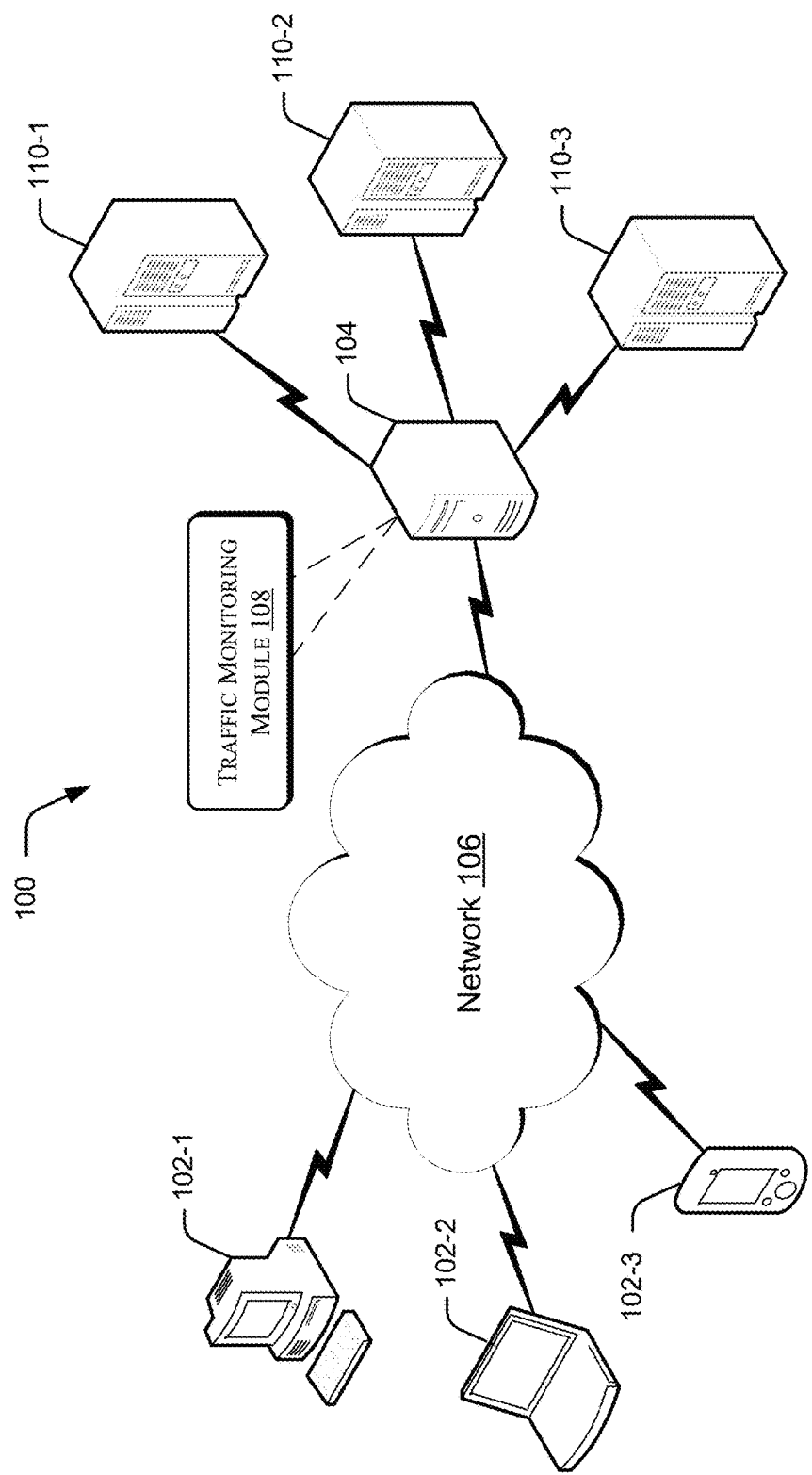
FIG. 1 illustrates a network environment, implementing a DNS server, according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Conventionally, various techniques for managing traffic-overload on a Domain Name System (DNS) server have been developed. Techniques, for handling flood attack on a DNS server and DNS spoofing have been developed in the past few years to handle traffic-overload generated as a result of Denial of Service (DoS) or Distributed Denial of Service (DDoS) attacks. Generally, the known techniques include methods of handling traffic-overload by identifying nodes that generate excess traffic, and initiating suitable actions against the identified nodes. Such nodes may be compromised by a malicious user and therefore may be generating excess traffic. The excess traffic may correspond to excess requests generated from such nodes that are transmitted to the DNS server. Further, the excess traffic may also be experienced by the DNS server while the DNS server is to send excess responses to such nodes. For the ease of explanation, nodes which generate request for the DNS server have been referred to as source nodes hereinafter. Similarly, nodes for which a response is generated by the DNS server have been referred to as target nodes, hereinafter.

The known techniques may monitor traffic generated from different source nodes to determine a condition of traffic-overload. Upon detecting the traffic-overload, the known techniques may determine specific source nodes from where the excess requests are generated and perform suitable actions on such source nodes. The suitable actions may correspond to one of completely blocking traffic generated by such source nodes, waiting for the traffic generated by such source nodes to resume to normal state, and separating malicious traffic from normal traffic. The known techniques may also maintain a list of such source nodes and may block requests from source nodes belonging to the list. Additionally, the traffic transmitted to the target nodes may also be verified for any kind of network attack. The known techniques may also identify the target nodes on which the excess traffic is directed. Thereafter, the excess traffic may either be blocked from reaching the target nodes or transmitted to the target nodes after applying suitable filtering. The suitable filtering may be applied on the traffic to separate legitimate traffic from malicious traffic. In one of the known techniques described in Patent Application CN 102 291 411 A, a D-DOS attack is detected by monitoring traffic at the DNS server.

Identification of such source nodes and initiating the suitable actions may cause additional tasks to be performed by the DNS server, thereby making the overall process of managing traffic-overload complex and time consuming. Further, initiating such actions for managing traffic-overload may affect the continuity of service to client devices. For example, in one known technique described in Patent Application US 2013/198269 A1, a method for DNS outage avoidance includes communicating a remote DNS server, in case a non-expired response is not available in a local cache associated with a DNS server which receives the request. On some instances, the excess traffic may exhaust resources of the DNS server by virtue of which the DNS server may not be able to respond to requests received from the source nodes, such as client devices. The inability to respond to requests may raise an error thereby disrupting the overall process. Furthermore, the known techniques are incapable of handling traffic-overload generated due to a compromised backend server or a compromised authoritative server.

Some existing techniques perform monitoring of packets on each source node to preempt conditions of Denial of Service (DoS) or Distributed Denial of Service (DDoS) on the DNS server. In such techniques, outgoing request packets (also called DNS queries according to RFC 1035) transmitted by the source nodes and incoming response packets received by the source nodes are monitored. For example, in one of the known prior technique described in a Publication, Namebench -Open-source DNS Benchmark Utility , a software application Namebench utilizes web-browser history, tcpdump output, or standardized datasets for checking name servers health and to provide a fastest DNS servers available for a computer. The monitoring of outgoing request packets and incoming response packets allows identification of incoming response packets that were not solicited by any outgoing request packets. The identification of such incoming response packets is indicative of a network attack that may have caused the additional packets to be delivered to the source node. After identifying such incoming response packets, an external device is generally activated to block transmission of packets from other source nodes corresponding to the identified response packets. However, utilization of such monitoring techniques employ multiple traffic monitoring units on each node or client device of a network to identify a network attack, which is cumbersome, as well as cost extensive. Further, the use of multiple equipments also induces latency in detecting any network attacks. Additionally, such techniques may cause different source nodes to detect the network attack at different times thereby creating ambiguity in detection of the network attack.

In accordance with an example implementation of the present subject matter, system(s) and method(s) for managing traffic-overload on a DNS server during a network overload are described. The described technique of managing traffic-overload ensures continuity of service in the event of the network overload such as a network attack and enables dynamic management of the traffic by the DNS server thereafter. Additionally, the described technique enables handling of traffic generated from a compromised backend server during the network attack. In the network environment, for the sake of explanation, communication device of a user has been referred to as the client device, hereinafter.

In an implementation of the present subject matter, the DNS server may enable management of the traffic-overload during the network overload, such as a payload or non-malicious overload, or during a network attack, such as a Denial of Service (DoS) attack or a Distributed Denial of Service (DDoS) attack. The DNS server may monitor traffic corresponding to the multiple requests and the multiple responses received by the DNS server. During the traffic-overload, the DNS server may activate (deactivate) a rescue mode and implement policies for handling the requests and the responses. The policies are adapted in such a manner that the multiple requests may be processed without exhausting resources of the DNS server and service continuity may be maintained throughout for the client devices.

In the rescue mode, the policies are implemented to segregate the multiple requests into three sets of requests based on availability of corresponding responses in a cache of the DNS server. In an implementation, the DNS server may respond to a first set of requests with a corresponding set of responses which have expired in the cache based on Time to Live (TTL) associated with them. Also, the DNS server may respond to a second set of requests with a corresponding set of responses that are stored in the cache. Further, the DNS server may relay a third set of requests to a backend server or an authoritative server for which a corresponding set of responses are not available in the cache. The backend server may provide a set of responses to the client devices and the DNS server, corresponding to the third set of requests.

In operation, the DNS server may monitor traffic generated from multiple client devices. The traffic may include the multiple requests received by the DNS server, referred to as inbound traffic, and the multiple responses transmitted by the DNS server, referred to as outbound traffic. The DNS server may then identify an occurrence of an event to trigger the rescue mode. The rescue mode may enable implementing one or more policies associated with the handling of the requests and the responses, by the DNS server. The policies may be implemented in order to manage the traffic-overload.

For example, if occurrence of the event is identified, the one or more policies are implemented to segregate the multiple requests into a first set of requests, a second set of requests and a third set of requests based on availability of responses in a cache corresponding to the multiple requests, and a Time to Live (TTL) associated with the responses. In a scenario, the cache may be associated with the DNS server. Further, the one or more policies may be implemented to process the first set of requests from amongst the multiple requests without communicating with a backend server. The processing of the first set of requests may include translating the first set of requests to a corresponding first set of responses. In operation, the DNS server may identify expired responses corresponding to the first set of requests, to be available in the cache. In the said implementation, the expired responses may be sent to the client devices as the first set of responses. In an implementation, the first set of responses corresponding to the first set of requests may have expired based on the TTL associated with each of the multiple responses. Thereafter, the first set of responses is transmitted to the multiple client devices.

Techniques of the present subject matter provide enhanced management of traffic-overload on a DNS server by determining requests that can be processed by the DNS server and thereafter processing such requests with minimum processing time. Identifying and providing the expired responses corresponding to a set of requests may allow the DNS server to respond to requests in a time bound manner in traffic-overload situations. Since the DNS server may provide an outdated response (with expired TTL) to the requests of the client devices, the DNS server may not exhaust its resources in requesting up-to-date responses corresponding to the requests for which expired responses are existing, during the instances of traffic-overload. Therefore, during instances of traffic-overload, the DNS server may be available, and may provide reply to the requests received from the client devices.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and implementations of the invention, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the words "connected" and "coupled" are used throughout for clarity of the description and can include either a direct connection or an indirect connection. Thus, if a first device couples to a second device, that connection may be through a direct electrical or mechanical connection, through an indirect electrical or mechanical connection via other devices and connections, through an optical electrical connection, or through a wireless electrical connection. Various implementations of the present subject matter have been described below by referring to several examples.

The above mentioned methods and systems are further described with reference to FIG. 1 to FIG. 4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

FIG. 1 illustrates a network environment 100 according to an implementation of the present subject matter. The network environment 100 may either be a public distributed environment or may be a private closed network environment. The network environment 100 may include different client devices 102-1, 102-2, . . . , 102-N, communicatively coupled to a Domain Name System (DNS) server 104 through a network 106. The DNS server 104 may include a traffic monitoring module 108 for monitoring traffic associated with the DNS server 104. Further, the DNS server 104 may be communicatively coupled to different backend servers 110-1, 110-2, . . . , 110-N. For the sake of explanation, the client devices 102-1, 102-2, . . . , 102-N, have been commonly referred to as client devices 102, and have been individually referred to as client device 102, hereinafter. In a similar manner, the backend servers 110-1, 110-2, . . . , 110-N, have been commonly referred to as backend servers 110, and have been individually referred to as backend server 110, hereinafter.

In an implementation of the present subject matter, the client device 102 may be one of a desktop, a mobile device and a laptop through which a user may request a website using a Uniform Resource Locator (URL). In an implementation, the DNS server 104 may be a name server for parsing domain name requests and identifying a Top Level Domain (TLD) and Second Level Domain (SLD) from the domain name request and translating the domain name request into a corresponding Internet Protocol (IP) address. The DNS server 104 may also be one of a web server that provides access to the digital content to the client devices 102, recursive DNS server, forwarding DNS server and a caching DNS server.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as transceivers, gateways, and routers; however, such details have been omitted for ease of understanding. The backend server 110 may be one of an authoritative server for providing IP address information to the DNS server 104, a name server, a recursive server and a web server hat provides access to the digital content to the client devices 102.

The network environment 100 may enable users of the client devices 102 to request various websites and access these websites on their respective client devices 102. The DNS server 104 may parse the request for the website and identify domain names associated with the website. The DNS server 104 may also determine an IP address corresponding to the identified domain name. The DNS server 104 may then send the IP address to the client devices 102 as a response.

In an implementation, the DNS server 104 may also communicate with backend servers 110 when the DNS server 104 is not able to determine the IP address corresponding to a client device's 102 request. In the said implementation, the DNS server 104 may request the IP address from the backend servers 110. Upon receiving the request, the backend servers 110 may then provide the IP address as a response to the DNS server 104 without any interruption or delay in the service. Also, the DNS server 104 may ensure service continuity by offering sufficient resources for handling extra traffic during the traffic-overload.

In operation, the client devices 102 may generate multiple requests for one or more domain names when the client device 102 is connected to the network 106. The multiple requests may be generated when a user may intend to access a website and enter the website name or a Uniform Resource Locator (URL) in address bar of a web explorer. The multiple requests may then be transmitted to the DNS server 104.

In an implementation of the present subject matter, the DNS server 104 may receive the multiple requests from the client devices 102. The DNS server 104 may then parse the multiple requests to identify the one or more domain names associated with one or more websites. Thereafter, the DNS server 104 may check whether corresponding IP addresses for the one or more domain names are available within the cache of the DNS server 104. In said implementation of the present subject matter, each IP address may be associated with a host that stores content related to the one or more websites. If the corresponding IP addresses are available, then the DNS server may generate corresponding responses for the multiple requests. In an example implementation, availability of the IP addresses may be determined based on mapping information stored in the cache of the DNS server. The mapping information may include details of domain names that are stored along with their respective IP addresses. Thereafter, a response may be generated by including a corresponding IP address for each of the multiple requests to generate corresponding responses. The corresponding responses may then be transmitted to the client devices 102.

In an implementation of the present subject matter, the client devices 102 may then communicate with respective hosts based on the IP addresses received by the DNS server 104. During communication with the hosts, the client devices 102 may obtain the content associated with the one or more websites. For example, a client device 102 may communicate with a host, with an IP address 111.XXX.111.XX that hosts an online shopping website. During communication with the host, the client device 102 may request information about a list of footwear products that a user of the client device 102 intends to purchase. The host may then transmit the information for the list to the client device 102. The list of products may then be accessed by the user for placing an order.

During the network attacks, one or more client devices 102 may be compromised by the malicious user. Such compromised client devices 102 may generate extra traffic by generating requests more than normal rate of requests and may send them to the DNS server 104. Similar to the client devices 102, one or more backend servers 110 may also be compromised by the malicious user to generate extra traffic. The extra traffic may also exhaust the resources of the DNS server.

In an implementation of the present subject matter, the DNS server 104 may identify an occurrence of an event associated with the DNS server 104. In said implementation, the occurrence of the event can be understood as a signal to trigger a rescue mode.

In an implementation, the event may be external or internal to the system, In another implementation, the event may be one of receiving a user command, or an automatic command, or a programmable command in relation with a third party. In another implementation, the event may be non-functioning of another server linked to the DNS server 104. In yet another implementation, the event may be the traffic exceeding a predefined threshold, where the traffic corresponds to one of the multiple requests received by the DNS server 104 and the multiple responses transmitted by the DNS server 104. Therefore, based on occurrence of any of the above described events, the rescue mode may be triggered.

In an example, for detecting the traffic exceeding the predefined threshold, the DNS server 104 may monitor its traffic. That is, the DNS server 104 may monitor the requests received by the DNS server 104 and the responses transmitted by the DNS server 104. In an example implementation, the traffic monitoring module 108 may monitor traffic of the DNS server 104. The traffic monitoring module 108 may monitor the traffic received by the DNS server 104 to identify the occurrence of the event. In an implementation, upon identification of the event, the DNS server 104 may activate the rescue mode. In the rescue mode, the DNS server 104 may implement one or more policies for handling requests and responses to manage the traffic-overload. For the sake of explanation, the description of the one or more policies implemented in the rescue mode has been further explained with reference to FIG. 2

Figure 2:
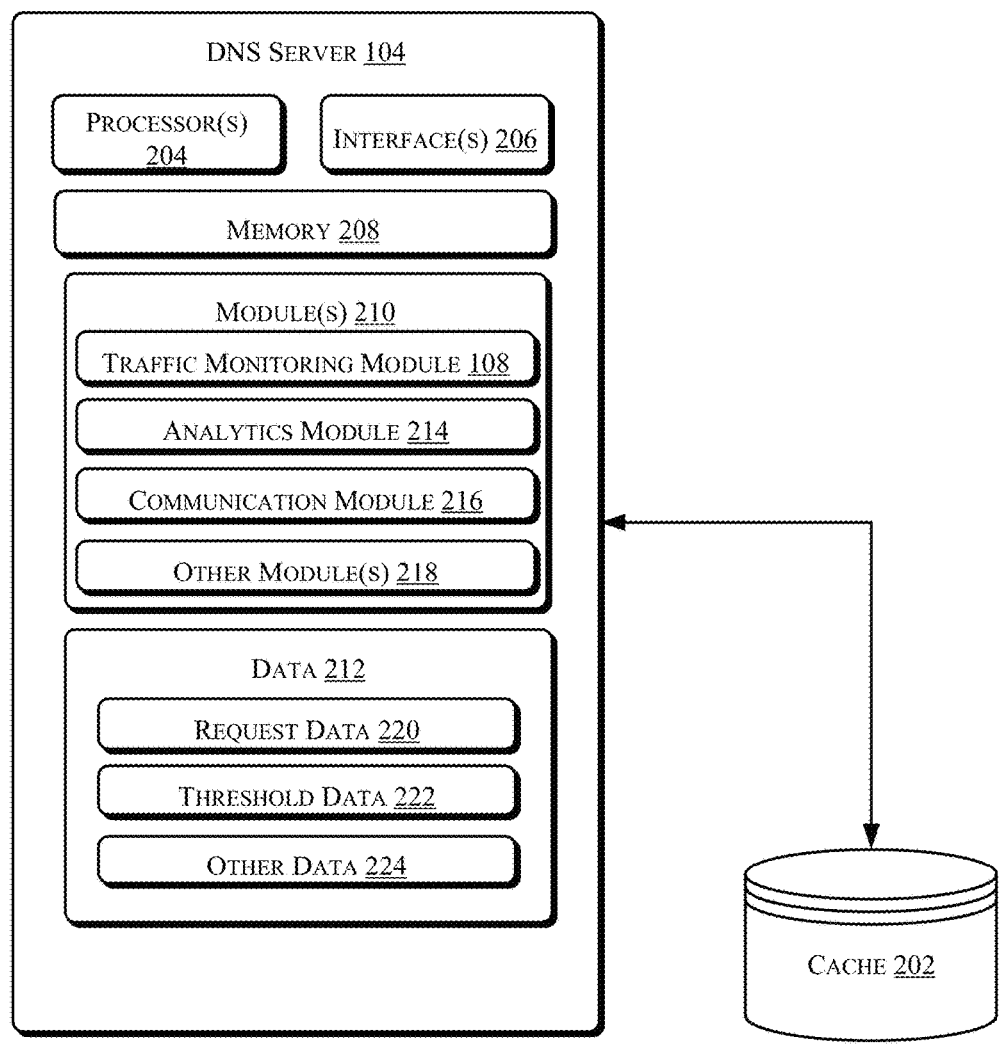
FIG. 2 illustrates schematic representation of components of the DNS server, in accordance with an implementation of the present subject matter.

FIG. 2 illustrates components of the DNS server 104, in accordance with an implementation of the present subject matter. The DNS server may be associated with a cache 202. The DNS server 104 may include a processor(s) 204, an interface(s) 206, and a memory 208. Further, the DNS server 104 may include module(s) 210 and data 212.

Among other capabilities, the cache 202 may serve as an external repository for storing information about frequently requested domain names and host addresses. In an implementation of the present subject matter, the cache 202 may store mapping information for domain names and their respective IP addresses. In an example implementation, the cache 202 may be an internal repository within the DNS server 104 for storing the information about frequently requested domain names. Although the cache 202 has been depicted to be outside the DNS server 104, the cache may be also be implemented within the DNS server 104, such as within the memory 208, according to an implementation of the present subject matter.

The processor 204, amongst other capabilities, may be configured to fetch and execute computer-readable instructions stored in the memory 208. The processor 204 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 206 may include a variety of machine readable instructions-based interfaces and hardware interfaces that allow the DNS server 104 to interact with different entities, such as the processor 204, the module 210, and the data 212. Further, the interface(s) 206 may enable the components of the DNS server 104 to communicate with other DNS servers, and external repositories. The interfaces 206 may facilitate multiple communications within a wide variety of networks and protocol types, including wireless networks, wireless Local Area Network (WLAN), RAN, satellite-based network, etc.

The memory 208 may be coupled to the processor 204 and may, among other capabilities, provide data and instructions for generating different requests. The memory 208 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 210 may include routines, programs, objects, components, data structures, and the like, which perform particular tasks or implement particular abstract data types. The module(s) 210 may further include modules that supplement applications on the DNS server 104, for example, modules of an operating system. Further, the module 210 can be implemented in hardware, instructions executed by a processing unit, or by a combination thereof.

In another aspect of the present subject matter, the module(s) 210 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The data 212 serves, amongst other things, as a repository for storing data that may be fetched, processed, received, or generated by one or more of the module(s) 210.

The module(s) 210 may perform different functionalities which may include, but may not be limited to, monitoring traffic received by the DNS server 104, analyzing the traffic and comparing the traffic to a predetermined threshold and communicating with the client devices 102 and the back end servers 110. Accordingly, the module(s) 210 may include a traffic monitoring module 108 for monitoring the traffic, an analytics module 214, and a communication module 216. Further, the module(s) 210 may include other module(s) 218 for some additional operations, such as, but may not be limited to, selection of the predetermined threshold, and determining one or more policies to be implemented during rescue mode. The data 212 may include request data 220, threshold data 222 and other data 224.

In operation, the DNS server 104 may receive the multiple requests from the client device 102 through the communication module 216 during the network attack. Each client device 102 may generate one or more requests. The traffic monitoring module 108 may monitor the multiple requests received by the DNS server 104 to determine inbound traffic of the DNS server 104. The traffic may be monitored using some known technique, such as, a sliding time window, a ratio, a tracker, a pattern matching.

The analytics module 214 may then identify the occurrence of the event to trigger the rescue mode. In an implementation of the present subject matter, the analytics module 214 may identify the event upon receiving one of the user command, the automatic command, and the programmable command in relation with a backend server. In another implementation, the analytics module 214 may identify the event in response to non-functioning of another server linked to the DNS server 104. In yet another implementation, the analytics module 214 may identify the event when the traffic, corresponding to one of the multiple requests received by the DNS server 104 and the multiple responses transmitted by the DNS server 104, exceeds the predefined threshold. For example, the event may be identified when a server administrator may enter one of an activation command and a begin command through the interface 206 to trigger the rescue mode. In another example, the event may be identified when the server administrator may press one of a suitable key and a button to trigger the rescue mode.

In an implementation of the present subject matter, to identify the traffic exceeding the predetermined threshold, the analytics module 214 may compare the traffic with the predetermined threshold. Here, the analytics module 214 may determine the predetermined threshold based on threshold data 222. For example, the predetermined threshold for the inbound traffic may be about 200000 Query per Second (QPS). In another example, the predetermined threshold for the outbound traffic may be 500 QPS and about 10 percent of the requests not replied by the DNS server 104 and relayed to a backend server 110. In situations where the traffic exceeds the predetermined threshold, the analytics module 216 may generate the event to trigger the rescue mode.

Upon identification of the event, the analytics module 214 may trigger the rescue mode. In the rescue mode, the analytics module 214 may implement one or more policies for handling the traffic associated with the DNS server. In an implementation, the DNS server 104 may utilize additional resources in the rescue mode to handle the traffic. For example, the DNS server may utilize about two 10 Gigabit (Gb) Ethernet ports each for handling inbound traffic and outbound traffic respectively. In another example, the DNS server may also utilize about four 1 Gb Ethernet ports to handle the traffic.

In an implementation of the present subject matter, the analytics module 214 may parse the multiple requests to determine if corresponding responses are available in the cache 202. The responses may refer to corresponding IP addresses of hosts that may contain content associated with the one or more websites. In an implementation of the present subject matter, the analytics module 214 may segregate the multiple requests into three or more sets of requests based on availability of responses in the cache. For example, the analytics module 214 may categorize the multiple requests into a first set of requests, a second set of requests and a third set of requests for which corresponding responses are available in the cache. Similarly, the analytics module 214 may categorize the multiple requests into another set of requests for which corresponding responses are not available in the cache.

In an implementation, of the present subject matter, the analytics module 214 may implement the one or more policies in the rescue mode to categorize the multiple requests into the first set of requests. The first set of requests may include requests for which corresponding responses are stored in the cache 202 but are expired. The corresponding responses may be expired based on a TTL associated with the responses. For example, a response including an IP address may have a TTL of 12 hours (hrs) in the cache 202. In the said example, the response may be active for the period of 12 hrs in the cache 202 and expire after 12 hrs. In an implementation, the expired response can be understood as a response including an expired IP address. Here, the expired IP address may be a previous IP address of a host that may have been updated or changed. In an implementation of the present subject matter, the TTL may be for a short period of time, such as 1-2 hrs. In another implementation, the TTL may be a fixed TTL that may be constant for different types of responses. In another implementation, the TTL may be a programmable TTL that may be programmed to be adaptive for different responses stored in the cache 202. In yet another implementation, the TTL may be correlated with a specific event and may change based on a current event.

In an implementation, the analytics module 214 may collate response for each request of the first set of requests to generate the first set of responses. In an implementation, the analytics module 214 may generate the first set of responses based on mapping information for domain names and respective IP addresses stored in the cache 202. Thereafter, the communication module 216 may transmit the first set of responses to the client devices 102. In the said example, each response for each request of the first set of requests may include an IP address of which the TTL of 12 hrs has expired.

In an implementation, the analytics module 214 may implement the one or more policies in the rescue mode to categorize the multiple requests into a second set of requests. The second set of requests may include requests for which corresponding responses are stored in the cache 202. The analytics module 214 may collate response for each request of the second set of requests from within the cache 202 to generate the second set of responses. In an implementation, the analytics module 214 may generate the second set of responses based on mapping information for domain names and respective IP addresses stored in the cache 202. The communication module 216 may then transmit the second set of responses to the client devices 102. Since, the second set of responses are readily available in the cache, processing of the second set of requests and transmitting the second set of responses to the client devices is performed with minimum latency.

In an implementation of the present subject matter, the analytics module 214 may implement the one or more policies in the rescue mode to categorize the multiple requests into a third set of requests. The third set of requests may include requests for which corresponding responses are unavailable in the cache 202. The communication module 216 may then relay the third set of requests to an optimum backend server 110 for processing. The back end server can be understood as another server similar to the DNS server for processing the third set of requests. The backend server may also store corresponding responses for the third set of requests. In an implementation, the analytics module 214 may utilize request data 220 for relaying the third set of requests to the back end server 110. In an example implementation, the request data 220 may include information about type of requests that are frequently relayed to the backend server. In another example implementation, the request data 220 may include IP addresses of the backend servers that are most frequently selected for processing the third set of requests.

In an implementation of the present subject matter, before relaying the third set of requests to the backend server, the analytics module 214 may select the optimum backend server 110 based on round trip time of the backend servers 110 in responding to the DNS server 104. In another implementation of the present subject matter, the analytics module 214 may select the optimum backend server 110 based on load on the backend servers 110. A backend server with round trip time within prescribed limits or normal load conditions may be selected as the optimum backend server to which the third set of requests may be relayed. For example, an upper limit for the round trip time may be 3 seconds. A backend server 110 with round trip time in responding to the DNS server 104 less than or equal to 3 seconds may be selected as the optimum backend server. In a similar manner, a backend server that is under normal load with resources available to process the third set of requests may be selected as the optimum backend server 110.

In an implementation, the optimum backend server 110 may process the third set of requests that may be relayed to the optimum backend server by the DNS server 104. The optimum backend server may then collate response for each request of the third set of requests to generate the third set of responses. In an implementation, the third set of responses may include IP addresses of hosts that contain content associated with one or more websites as requested by one or more requests of the third set of requests. In an implementation, the optimum backend server may generate the third set of responses based on the mapping information for domain names and respective IP address stored in a cache of the optimum backend server 110. Thereafter, the optimum backend server 110 may transmit the third set of responses to the DNS server 104 and the client devices 102.

In an implementation of the present subject matter, the third set of responses is received by the communication module 216. After receiving, the third set of responses may be stored in the cache 202 for future use.

The description illustrates segregation of the multiple requests into different sets of requests for processing. However, it would be appreciated that the description may not be limited to generation of sets of requests and may process each request individually as soon as the request arrives at the DNS server 104. The description also illustrates generation of corresponding sets of responses and transmitting each set of responses to the client device. However, it would be appreciated that the description may not be limited to the generation of sets of responses and then transmitting the sets of responses but may generate a single response for a single request and transmit the single response to the client device 102 as soon as the single response is available.

Figure 3:
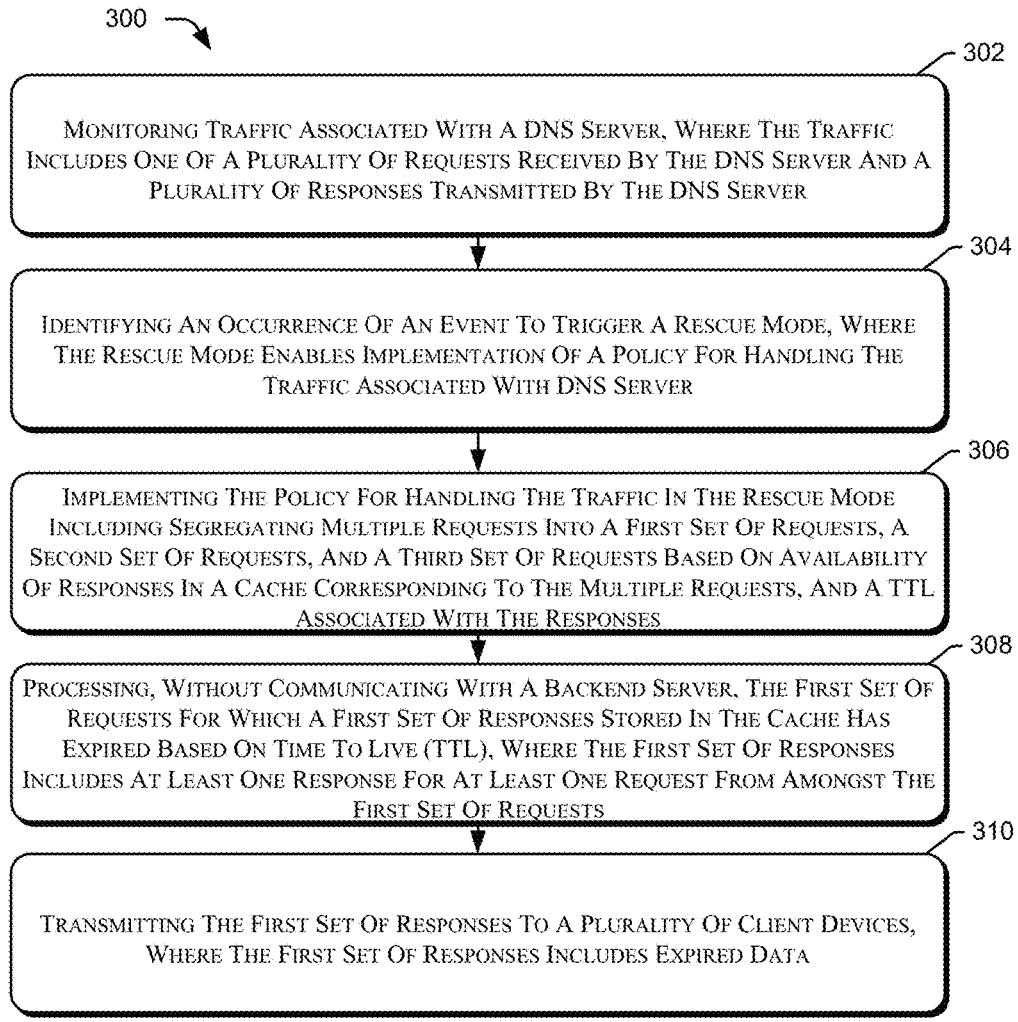
FIG. 3 illustrates a method for managing traffic-overload on the DNS server, according to an implementation of the present subject matter.
Figure 4:
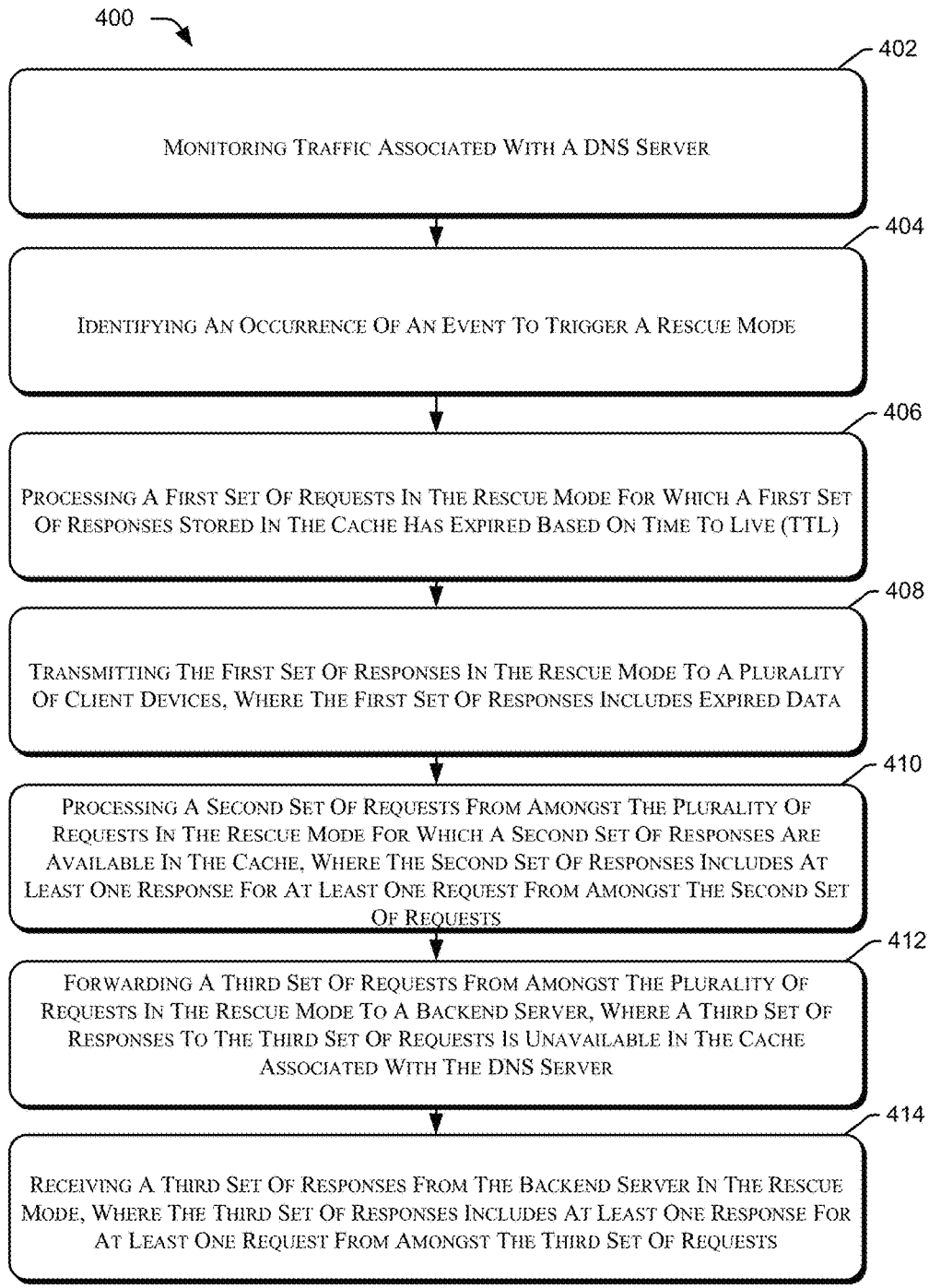
FIG. 4 illustrates a method for handling different sets of requests for managing traffic-overload on a DNS server, according to an implementation of the present subject matter.
Figure 5:
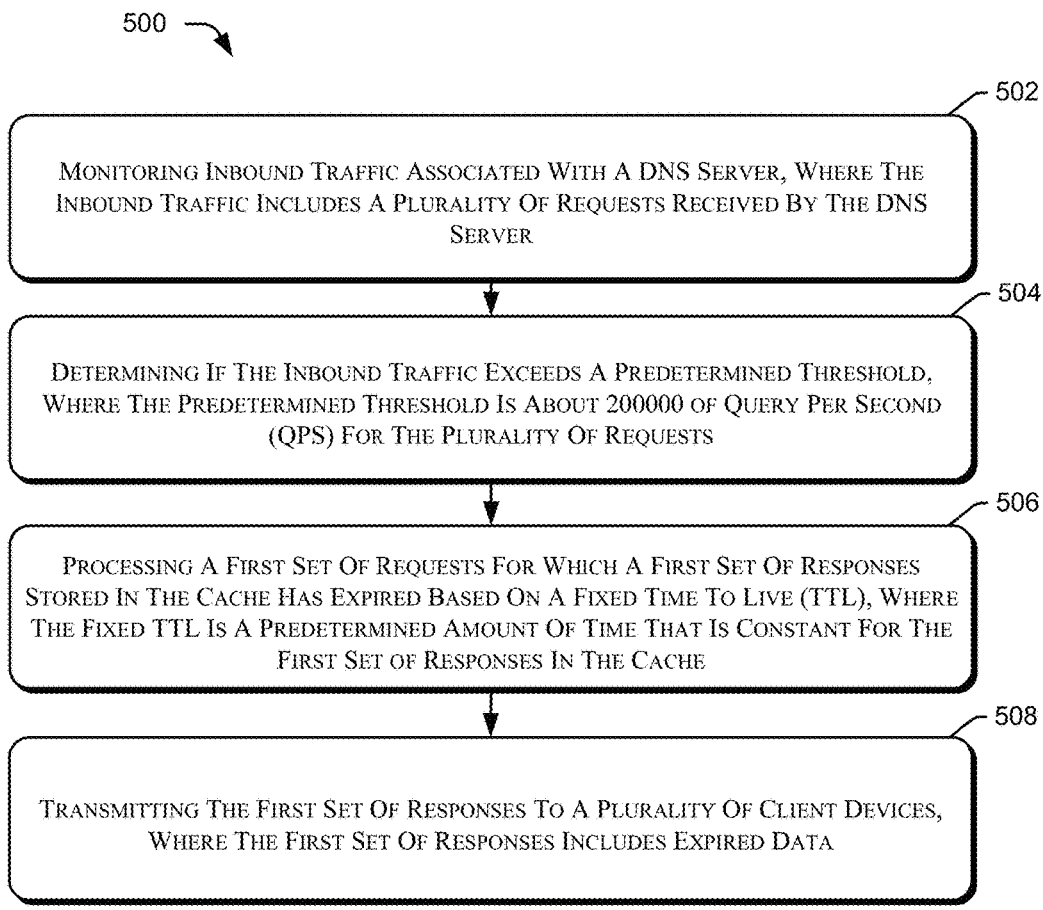
FIG. 5 illustrates a method for managing traffic-overload for inbound traffic, according to an implementation of the present subject matter.

FIG. 3, FIG. 4, and FIG. 5 illustrate methods 300, 400, and 500 respectively. The order in which the methods 300 and 400 are described is not intended to be construed as a limitation, and any number of the described method blocks may be combined in any order to implement the methods 300 and 400, or alternative methods. Furthermore, the methods 300 and 400 may be implemented by processor(s) or computing system(s) through any suitable hardware, non-transitory machine readable instructions, or combination thereof.

It may be understood that steps of the methods 300, 400, and 500 may be performed by programmed computing systems. The steps of the methods 300, 400, and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. In an implementation of the present subject matter, the methods 300 and 400 may be executed by the DNS server 104, as described earlier.

FIG. 3 illustrates the method 300 for managing traffic-overload on a DNS server, according to an implementation of the present subject matter.

At block 302, the traffic associated with the DNS server may be monitored during the network overload, such as a network attack or a non-malicious overload. In an example implementation of the present subject matter, the traffic may include the multiple requests received by the DNS server 104, referred to as inbound traffic rate. The inbound traffic rate may be related to the one or more websites that the users of the client devices 102 intend to access. In another example implementation, the traffic may include the multiple responses transmitted by the DNS server 104, referred to as outbound traffic rate. The outbound traffic rate may include the IP addresses of corresponding hosts that store content for the one or more websites. In an implementation, the multiple responses may correspond to a set of responses received by the DNS server 104 from the backend server 110 that may then be forwarded by the DNS server 104 to the client devices 102. In an implementation of the present subject matter, the traffic may be monitored by the traffic monitoring module 108 of the DNS server 104.

At block 304, an occurrence of an event is identified to trigger the rescue mode. The rescue mode can be understood as a mode of the DNS server 104 in which one or more policies for handling the traffic associated with the DNS server 104 may be implemented. In an example implementation, the event may be identified when the DNS server 104 may receive one of a manual command, or an automatic command. In the said example implementation, the manual command or the automatic command may be associated with the rescue mode such that, execution of the manual command and the automatic command may result in activation of the rescue mode. In another example implementation, the event may be identified upon receiving a programmable command in relation with a third party. In yet another example implementation, the event may be identified when another server linked to the DNS server 104 is non-functioning.

At block 306, the one or more policies may be implemented in the rescue mode. In an implementation, the one or more policies may be implemented to handle the traffic in the rescue mode. In another implementation the traffic may correspond to traffic-overload in the rescue mode. As given in block 306, implementing the one or more policies may include segregate the multiple requests of the traffic into a first set of requests, a second set of requests, and a third set of requests based on availability of responses in a cache corresponding to the multiple requests, and a Time to Live (TTL) associated with the responses. In an implementation, the analytics module 214 may segregate the multiple requests into the three sets of requests. At block 308, the one or more policies may be implemented to process without communicating with a backend server 110, the first set of requests from among the multiple requests. In an implementation, the first set of requests may be processed by the DNS server 104. In the said implementation, the first set of requests may correspond to a set of requests for which corresponding responses stored in the cache of the DNS server 104 may have expired. The corresponding responses may have expired based on the TTL of the responses in the cache. In the said implementation, the analytics module 214 of the DNS server 104 may determine the first set of responses by including one or more responses for one or more requests of the first set of requests.

At block 310, the first set of responses may be transmitted to the client devices 102. The one or more responses may include an expired data, such as, an expired IP address. In an implementation of the present subject matter, the first set of responses that includes the expired data may be transmitted by the communication module 216 of the DNS server 104 to the client devices 102.

FIG. 4 illustrates the method 400 for handling different sets of requests for managing traffic-overload on a DNS server, according to an implementation of the present subject matter.

At block 402, the traffic associated with the DNS server is monitored. In an implementation of the present subject matter, the traffic may be monitored by the traffic monitoring module 108 of the DNS server 104.

At block 404, an occurrence of the event is identified to trigger the rescue mode. In an example implementation, the event may be identified when the DNS server 104 may receive one of the manual command, the automatic command, and the programmable command in relation with a backup server. In another example implementation, the event may be identified when another server linked to the DNS server 104 is non-functioning.

At block 406, the first set of requests from amongst the multiple requests may be processed in the rescue mode. In a scenario, the first set of requests may be processed without communicating with a backend server 110. In an implementation, the first set of requests may correspond to a set of requests for which corresponding responses stored in the cache of the DNS server 104 may have expired. The corresponding responses may have expired based on Time to Live (TTL) of the responses in the cache. In the said implementation, the first set of requests may be processed by the DNS server 104. The processing may include translating each of the first set of requests into a corresponding IP address and determine the first set of responses. At block 408, the first set of responses may then be transmitted to the client devices. In an implementation, the first set of responses may include expired data. In the said implementation, the first set of responses may be transmitted by the communication module 216 of the DNS server 104 to the client devices 102.

At block 410, the second set of requests from amongst the multiple requests may be processed in the rescue mode. In an implementation, the second set may be a set of requests for which corresponding responses may be stored in the cache 202 of the DNS server 104. In an implementation, the analytics module 214 may process the second set of requests by determining one or more responses for one or more requests of the second set of requests. Thereafter, the analytics module 214 may determine the second set of responses corresponding to the second set of requests. In an implementation of the present subject matter, the second set of responses may then be transmitted to the client devices 102.

At block 412, the third set of requests from amongst the multiple requests may be forwarded to the backend server in the rescue mode. Here, the third set of requests may be a set of requests for which corresponding responses may not be stored in the cache of the DNS server. In an implementation of the present subject matter, the third set of requests may be forwarded by the DNS server 104 to the backend server 110. In the said implementation, the third set of requests may be processed by the backend server 110 to determine the third set of responses. Thereafter, the third set of responses may be transmitted to the DNS server 104 and the client devices 102.

At block 414, the third set of responses may be received from the backend server 110 in the rescue mode. The third set of responses may include one or more responses for one or more requests from amongst the third set of requests. The third set of responses may be received in response to processing of the third set of requests by the backend server 110. Thereafter, the third set of responses may be stored in the cache 202 for future use.

FIG. 5 illustrates the method 500 for managing traffic-overload for inbound traffic, according to an implementation of the present subject matter. At block 502, the inbound traffic associated with a DNS server is monitored. In an implementation of the present subject matter, the inbound traffic may be associated with the DNS server 104. In the said implementation, the inbound traffic may include multiple requests received by the DNS server 104.

At block 504, it is determined whether the inbound traffic exceeds a predetermined threshold. For example, one predetermined threshold may be about 200000 Query Per Second (qps) for the multiple requests. Another threshold may be about 5000 QPS for the plurality of responses. Another threshold may be in relation with a ratio between outgoing requests and incoming responses. In an implementation of the present subject matter, the DNS server 104 may continuously monitor the inbound traffic and compare the inbound traffic with the predetermined threshold. Thereafter, the DNS server 104 may determine if the inbound traffic exceeds the predetermined threshold based on the comparison.

At block 506, a first set of requests may be processed. In a scenario, the first set of requests may be processed without communicating with a backend server 110. The first set of requests may be a set of requests for which corresponding responses stored in the cache have expired. The responses may be expired based on a fixed TTL of the corresponding responses. The fixed TTL can be understood as a fixed amount of time that may be constant for different kinds of responses. For example, the DNS server 104 may have a fixed TTL of 15 hrs for different kinds of responses stored in the cache of the DNS server. In an implementation of the present subject matter, the first set of requests may be processed by analytics module 214 the DNS server 104 to determine the first set of responses.

Thereafter at block 508, the first set of responses may be transmitted to the client devices. In an implementation of the present subject matter, the first set of responses may be transmitted to the client devices 102. Here, the first set of responses may include expired data. In an example implementation, the expired data may correspond to a previous IP address of a host that might have changed to a new IP address.

Although implementations of present subject matter have been described in language specific to structural features and/or methods, it is to be understood that the present subject matter is not necessarily limited to the specific features or methods described. Rather, the specific features and methods are disclosed and explained in the context of a few example implementations for DNS servers.

We claim:

1. A method for managing traffic-overload in a DNS server during a network overload, the method comprising:
    monitoring traffic associated with the DNS server, wherein the traffic includes at least one of a plurality of requests received by the DNS server and a plurality of responses transmitted by the DNS server;
    identifying an occurrence of an event to trigger a rescue mode, wherein the rescue mode enables implementation of at least one policy for handling of the traffic associated with the DNS server; and
    implementing the at least one policy upon occurrence of the event, for handling the traffic, wherein the at least one policy comprises:
    segregating the plurality of requests into a first set of requests, a second set of requests, and a third set of requests based on availability of responses in a cache corresponding to the plurality of requests, and a Time to Live (TTL) associated with the responses, wherein the cache is associated with the DNS server;
    processing, without communicating with a backend server, the first set of requests from amongst the plurality of requests for which a first set of responses stored in the cache has expired based on the TTL, wherein the first set of responses include at least one response for each request from amongst the first set of requests; and
    transmitting the first set of responses to a plurality of client devices, wherein the first set of responses includes expired data.

2. The method as claimed in claim 1, wherein the at least one policy further comprises processing the second set of requests from amongst the plurality of requests for which a second set of responses are available in the cache, wherein the second set of responses includes at least one response for at least one request from amongst the second set of requests.

3. The method as claimed in claim 1, wherein the at least one policy further comprises forwarding the third set of requests from amongst the plurality of requests to the backend server, wherein the backend server is utilized for processing the third set of requests, and wherein a third set of responses for the third set of requests is unavailable in the cache associated with the DNS server, and wherein the third set of responses includes at least one response for at least one request from amongst the third set of requests.

4. The method as claimed in claim 3, wherein forwarding the third set comprises selecting the backend server based on at least one of a round trip time of the backend server in responding to the requests of the DNS server and a load on the backend server.

5. The method as claimed in claim 1, wherein the event is one of receiving at least one user command, at least one automatic command, at least one programmable command in relation with a third party, non-functioning of another server linked to the DNS server, and at least one of the plurality of requests received by the DNS server and the plurality of responses transmitted by the DNS server exceeding a predetermined threshold.

6. The method as claimed in claim 5, wherein the predetermined threshold is at least one of about 200000 of query per second (QPS) for the plurality of requests, and about 5000 QPS for the plurality of responses, and a ratio between outgoing requests and incoming responses.

7. The method as claimed in claim 1, wherein the TTL is one of a short TTL, a fixed TTL, a programmable TTL and a TTL correlated with a specific event.

8. The method as claimed in claim 1, wherein the network overload corresponds to at least one of a non-malicious overload, a payload, a network attack, a Denial of Service (DoS) attack and a Distributed Denial of Service (DDoS) attack on the DNS server.

9. The method as claimed in claim 3 further comprising:
    receiving the third set of responses from the backend server, wherein the third set of responses corresponds to the third set of requests forwarded to the backend server, and wherein the third set of responses includes at least one response for at least one request from amongst the third set of requests; and
    storing the third set of responses in the cache associated with the DNS server.

10. A DNS server for managing traffic-overload, the DNS server comprising:
    a processor;
    a traffic monitoring module coupled to the processor, wherein the traffic monitoring module is to monitor traffic associated with the DNS server, wherein the traffic includes at least one of a plurality of requests received by the DNS server and a plurality of responses transmitted by the DNS server;
    an analytics module coupled to the processor, wherein the analytics module is to:
        identify an occurrence of an event to trigger a rescue mode, wherein the rescue mode enables implementation of at least one policy for handling of the traffic associated with the DNS server; and
        implement the at least one policy upon occurrence of the event, for handling the traffic, wherein the at least one policy comprises:

segregate the plurality of requests into a first set of requests, a second set of requests, and a third set of requests based on availability of responses in a cache corresponding to the plurality of requests, and a Time to Live (TTL) associated with the responses, wherein the cache is associated with the DNS server;

process without communicating with a backend server, the first set of requests from amongst the plurality of requests for which a first set of responses stored in the cache has expired based on the TTL, wherein the first set of responses include at least one response for each request from amongst the first set of requests;

a communication module coupled to the processor, wherein the communication module is to transmit the first set of responses to a plurality of client devices, wherein the first set of responses includes expired data.

11. The DNS server as claimed in claim 10, wherein the analytics module is to:

compare the traffic with a predetermined threshold to identify the occurrence of the event to trigger the rescue mode, wherein the event is identified in response to at least one of the plurality of requests received by the DNS server and the plurality of responses transmitted by the DNS server exceeding the predetermined threshold; and select the backend server based on at least one of a round trip time of the backend server in responding to the requests of the DNS server and a load on the backend server.

12. The DNS server as claimed in claim 10, wherein the communication module is to:

forward the third set of requests from amongst the plurality of requests to the backend server, wherein a third set of response is unavailable in the cache associated with the DNS server, wherein the backend server is utilized for processing the third set of requests, and wherein the third set of responses includes at least one response for at least one request from amongst the third set of requests;

receive the third set of responses from the backend server corresponding to the third set of requests; and store the third set of responses in the cache associated with the DNS server.

13. The DNS server as claimed in claim 10, wherein the event is one of receiving at least one user command, at least one automatic command, at least one programmable command in relation with a third party, non-functioning of another server linked to the DNS server, and at least one of the plurality of requests received by the DNS server and the plurality of responses transmitted by the DNS server exceeding a predetermined threshold.

14. The DNS server as claimed in claim 10, wherein the TTL is one of a short TTL, a fixed TTL, a programmable TTL and a TTL correlated with a specific event.

* * * * *